(12) United States Patent
Mukherjee et al.

(10) Patent No.: US 9,976,798 B2
(45) Date of Patent: May 22, 2018

(54) INSULATING MATERIAL WITH RENEWABLE RESOURCE COMPONENT

(71) Applicant: WHIRLPOOL CORPORATION, Benton Harbor, MI (US)

(72) Inventors: Diptesh Mukherjee, Pune (IN); Rameet Singh Grewal, Pune (IN)

(73) Assignee: Whirlpool Corporation, Benton Harbor, MI (US)

( * ) Notice: Subject to any disclaimer, the term of this patent is extended or adjusted under 35 U.S.C. 154(b) by 0 days. days.

(21) Appl. No.: 15/702,101

(22) Filed: Sep. 12, 2017

(65) Prior Publication Data
US 2018/0031306 A1   Feb. 1, 2018

Related U.S. Application Data

(63) Continuation of application No. 14/964,178, filed on Dec. 9, 2015, now Pat. No. 9,791,205.

(51) Int. Cl.
*A47B 96/04* (2006.01)
*F25D 23/06* (2006.01)
*F16L 59/065* (2006.01)

(52) U.S. Cl.
CPC ......... *F25D 23/066* (2013.01); *F25D 23/063* (2013.01); *F16L 59/065* (2013.01); *F25D 2201/122* (2013.01); *F25D 2201/124* (2013.01); *F25D 2201/1262* (2013.01); *F25D 2201/14* (2013.01)

(58) Field of Classification Search
CPC .......... F25D 23/066; F25D 23/063; F25D 2201/122; F25D 2201/124; F25D 2201/1262; F25D 2201/14; F16L 59/065
See application file for complete search history.

(56) References Cited

U.S. PATENT DOCUMENTS

| | | | |
|---|---|---|---|
| 4,555,448 | A | 11/1985 | Durham |
| 5,866,247 | A | 2/1999 | Klatt et al. |
| 6,409,817 | B1 | 6/2002 | Stephens |
| 6,932,190 | B2 | 8/2005 | Sishtla |
| 7,935,223 | B2 | 5/2011 | Cao et al. |
| 8,080,133 | B2 | 12/2011 | Cao et al. |
| 8,133,357 | B2 | 3/2012 | Cao et al. |
| 2005/0042437 | A1 | 2/2005 | Ramesh et al. |

(Continued)

FOREIGN PATENT DOCUMENTS

| | | |
|---|---|---|
| CN | 1060428 C | 1/2001 |
| CN | 101126114 A | 2/2008 |

(Continued)

*Primary Examiner* — Hanh V Tran
(74) *Attorney, Agent, or Firm* — Price Heneveld LLP

(57) ABSTRACT

An insulated cabinet structure includes an inner liner having a plurality of walls defining a refrigerator compartment, and an external wrapper having a plurality of walls defining a refrigerator compartment receiving area. An insulation gap is formed between the walls of the inner liner and the walls of the external wrapper. A first insulation material is positioned on a wall of the external wrapper and extends outwardly into the insulation gap to partially fill the insulation gap. The first insulation material includes a renewable resource component having a particle size in a range from about 10 microns to about 25 microns. A second insulation material is disposed in the insulation gap, such that the first insulation material and the second insulation material together substantially fill the insulation gap.

19 Claims, 10 Drawing Sheets

(56) References Cited

U.S. PATENT DOCUMENTS

2012/0328887 A1    12/2012   Ryan et al.
2013/0257257 A1    10/2013   Cur et al.

FOREIGN PATENT DOCUMENTS

| | | |
|---|---|---|
| CN | 103420649 A | 12/2013 |
| CN | 103982020 A | 8/2014 |
| DE | 2847807 C2 | 3/1989 |
| DE | 19607962 C1 | 6/1997 |
| EP | 2789951 A1 | 10/2014 |
| WO | 2009032748 A2 | 3/2009 |
| WO | 2014023324 A1 | 2/2014 |

US 9,976,798 B2

INSULATING MATERIAL WITH RENEWABLE RESOURCE COMPONENT

CROSS-REFERENCE TO RELATED APPLICATION

The present application is a continuation of U.S. patent application Ser. No. 14/964,178 (now U.S. Pat. No. 9,791, 205), filed Dec. 9, 2015, entitled INSULATING MATERIAL WITH RENEWABLE RESOURCE COMPONENT, the entire disclosure of which is hereby incorporated herein by reference.

BACKGROUND

In order to provide increased efficiency for an insulated appliance, such as a refrigerator cabinet, the refrigerator cabinet must be sufficiently insulated to keep items within the refrigerator cool, as well as prevent heat from entering the refrigerator structure. Adding a renewable source component to an insulation component while lowering the cost of the overall refrigeration insulation is desired, such that new methods and materials of insulating a refrigerator are sought.

SUMMARY

One aspect of the present concept includes an insulating member having a body portion and a core portion disposed within an interior of the body portion. The core portion comprises a renewable resource component in an amount of 10%-90% by weight of the core portion, and further includes a particle size in a range from about 10 microns to about 25 microns. An exterior portion substantially surrounds the core portion, and includes an insulating material defining a vapor barrier around the core portion.

Another aspect of the present concept includes an insulated cabinet structure with an inner liner having a plurality of walls defining a refrigerator compartment, and an external wrapper having a plurality of walls defining a refrigerator compartment receiving area. An insulation gap is formed between the walls of the inner liner and the walls of the external wrapper. A first insulation material is positioned on a wall of the external wrapper and extends outwardly into the insulation gap to partially fill the insulation gap. The first insulation material includes a renewable resource component having a particle size in a range from about 10 microns to about 25 microns. A second insulation material is disposed in the insulation gap, such that the first insulation material and the second insulation material together substantially fill the insulation gap.

Yet, another aspect of the present concept includes an insulated cabinet structure with an inner liner having a plurality of walls defining a refrigerator compartment. An external wrapper includes a plurality of walls defining a refrigerator compartment receiving area. An insulation gap is formed between the walls of the inner liner and the walls of the external wrapper when the inner liner is at least partially received in the external wrapper. An insulation material is positioned in the insulation gap to substantially fill the insulation gap, wherein the insulation material includes a renewable resource component in an amount of about 10%-90% by weight of the insulation material. The renewable resource component includes a particle size in a range from about 10 microns to about 25 microns.

These and other features, advantages, and objects of the present device will be further understood and appreciated by those skilled in the art upon studying the following specification, claims, and appended drawings.

DETAILED DESCRIPTION OF EMBODIMENTS

Figure 1A:
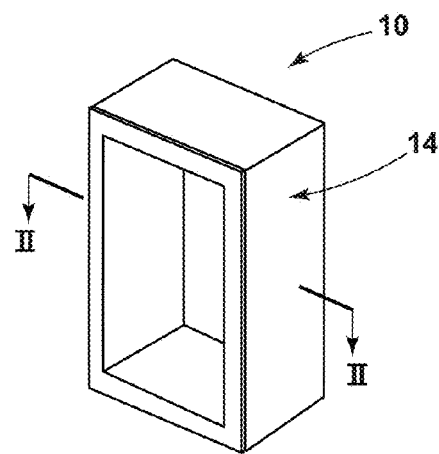
FIG. 1A is a top perspective view of a refrigerator cabinet, according to one embodiment.

For purposes of description herein the terms "upper," "lower," "right," "left," "rear," "front," "vertical," "horizontal," and derivatives thereof shall relate to the device as oriented in FIG. 1A. However, it is to be understood that the device may assume various alternative orientations and step sequences, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Referring now to FIG. 1A, a refrigerator 10 is shown having a cabinet 12 configured to generally define a refrigerator compartment 14. As shown in FIG. 1A, the refrigerator 10 is depicted as having a generally upright rectangular configuration, but may include any configuration for refrigerator known in the art including, but not limited to, French door, side-by-side, top freezer, bottom freezer, freezer-less, counter depth, compact, built-in, and other refrigerator configuration.

Figure 1B:
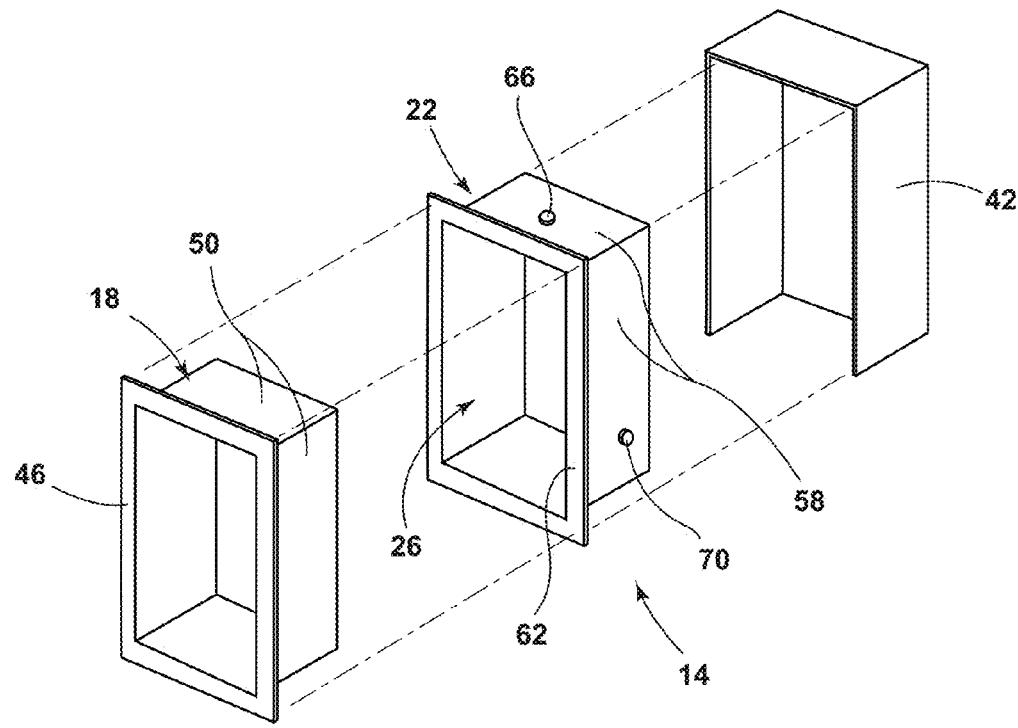
FIG. 1B is an exploded top perspective view of the refrigerator cabinet of FIG. 1A, according to one embodiment.

Referring now to FIG. 1B, the cabinet 12 is shown as including an inner liner 16 which generally defines the refrigerator compartment 14 via first and second sidewalls 18, 20, top wall 22, and bottom wall 24. A rear wall 26 closes the refrigerator compartment 14. A liner flange 28 is disposed around the inner liner 16 and connected to the first and second sidewalls 18, 20, as well as the top and bottom walls 22, 24 along a front portion of the inner liner 16, such that the liner flange 28 defines a forward face of the inner liner 16. In the depicted embodiment of FIG. 1B, the inner liner 16 has a generally rectangular box shape, but may take a variety of shapes including a cube, prism, parallelepiped, etc. and combinations thereof to suit a configuration of the refrigerator 10. The inner liner 16 may be formed from a polymeric material having high barrier properties (e.g., low gas permeation), metals and combinations thereof. The inner liner 16 may be formed via thermoforming, injection molding, bending and/or forming. The liner walls 18, 20, 22, 24 and 26 of the inner liner 16 may have a thickness ranging from between about 0.1 mm to about 1.0 mm. In a specific embodiment, the liner walls 18, 20, 22, 24, and 26 are contemplated to have a thickness of about 0.5 mm.

Referring again to FIG. 1B, the inner liner 16 is shown as being configured to mate, couple, or otherwise be positioned within an external wrapper 30. The external wrapper 30 includes first and second sidewalls 32, 34, top wall 36, and bottom wall 38. A rear wall 40 closes the refrigerator compartment. Thus, the external wrapper 30 has an overall configuration similar to that of the inner liner 16, such that the refrigerator compartment 14 of the inner liner 16 can be fully received within a refrigerator compartment receiving area 42 defined by the wrapper walls 32, 34, 36, 38 and 40. In a manner similar to the inner liner 16, the external wrapper 30 includes a wrapper flange 44 extending around the sidewalls 32, 34 and top and bottom walls 36, 38 at a forward portion of the external wrapper 30.

Figure 2:
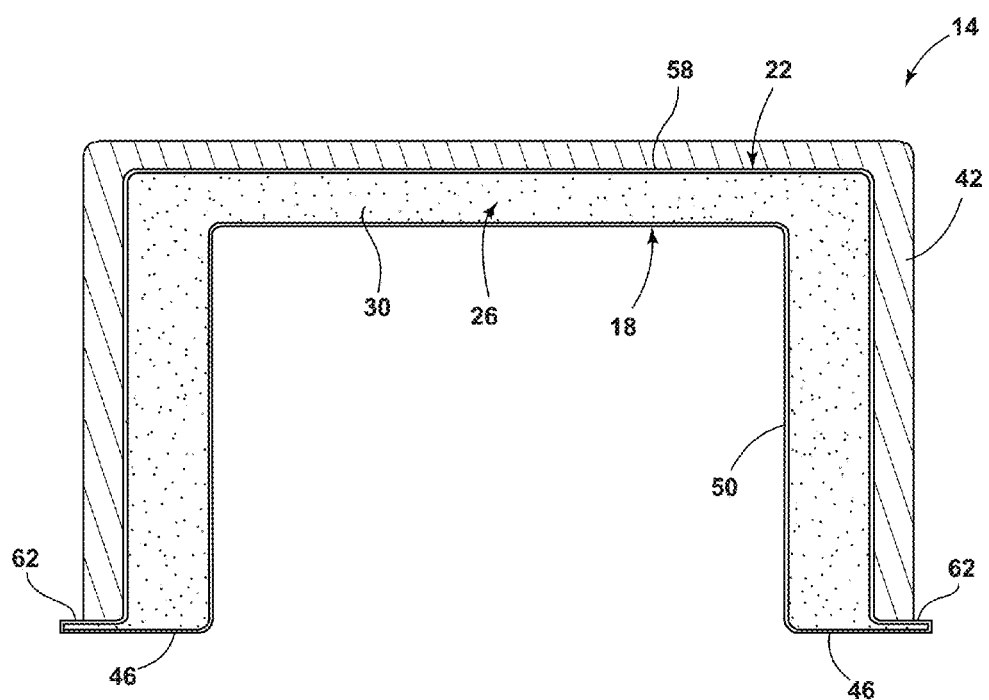
FIG. 2 is a cross-sectional view taken at line II of FIG. 1A.

In assembly, as shown in FIG. 2 and described below, the wrapper flange 44 and the liner flange 28 are configured to be coupled together to form the cabinet 12, as shown in FIG. 1A. The coupling of the liner flange 28 and the wrapper flange 44 is contemplated to be performed in such a manner that an airtight or hermetic seal is formed between the inner liner 16 and the external wrapper 30. The seal of the inner liner 16 to the external wrapper 30 may be achieved using adhesives, welding, crimping, or combinations of such coupling techniques. The external wrapper 30 may be formed of and by any of the materials and processes listed above in connection with the inner liner 16. The wrapper walls 32, 34, 36, 38 and 40 of the external wrapper 30 may have a thickness ranging from between about 0.1 mm to about 1.0 mm. In a specific embodiment, the wrapper walls 32, 34, 36, 38 and 40 have a thickness of about 0.5 mm. Any one of the wrapper walls 32, 34, 36, 38 and 40 of the external wrapper 30 may include an injection port 50 and/or a vacuum port 52, shown in FIG. 1B as disposed on top wall 36 and sidewall 34, respectively. The external wrapper 30 may include one or multiple injection ports 50 and/or vacuum ports 52. It will be understood that in alternative embodiments, the injection ports 50 and/or vacuum ports 52 may be disposed on both the external wrapper 30 and inner liner 16, or solely on either the inner liner 16 or external wrapper 30. The injection port 50 and the vacuum port 52 may be used to access (e.g., to inject an insulator, draw a vacuum and/or perform maintenance within) an insulation gap 54 formed between the refrigerator compartment 14 and the refrigerator compartment receiving area 40 once the inner liner 16 and the external wrapper 30 are bonded. The injection port 50 and the vacuum port 52 may have a diameter of between about 10 mm and about 30 mm, or between about 12.5 mm and about 25 mm. In various embodiments, the injection port 50 and the vacuum port 52 may have different diameters than one another. Similarly, in embodiments utilizing more than one injection port 50 and vacuum port 52, the sizes of the injection ports 50 and the vacuum ports 52 may vary. The insulating material 80 is positioned within the insulation gap 54 and in contact with both the wrapper walls 32, 34, 36, 38 and 40 and the liner walls 18, 20, 22, 24 and 26. The packing factor of the insulating material 30 within the gap 26 may be greater than about 60%, greater than about 62%, greater than about 65%, or greater than about 70%.

The insulating material 80 is configured not only to thermally insulate the inner liner 16 from the external wrapper 30, but also to resist the inward directed force of the atmosphere on the lower than atmosphere pressure of the insulation gap 54. Atmospheric pressure on the inner liner 16 and the external wrapper 30 may cause distortions which are unsightly and may lead to a rupture in either of the inner liner 16 or the external wrapper 30 thereby causing a loss of vacuum in the insulation gap 54. Further, drawing the vacuum in the insulation gap 54 may cause an impact or shock loading of the insulating material 80 as the inner liner 16 and the external wrapper 30 contract around the insulating material 80. Accordingly, the insulating material 80 should have sufficient crush resistance to resist deformation of the inner liner 16 and the external wrapper 30 due to a pressure gradient between the atmosphere and an air pressure of the insulation gap 54. The insulating material may also serve as a sound dampening mechanism in assembly.

Referring again to FIG. 1B, an exterior shell 60 may also be included in the formation of the cabinet 12, wherein the exterior shell 60 includes first and second side walls 62, 64 as well as top wall 66 and rear wall 68. The first and second sidewalls 62, 64 and top wall 66 are configured to align with an outer perimeter of the liner flange 28 and wrapper flange 44 as coupled together. The exterior shell 60 generally defines a cabinet receiving area 70 which is configured to receive the inner liner 16 and external wrapper 30 as coupled together therein.

Referring now to FIG. 2, the inner liner 16 and external wrapper 30 are shown coupled together, such that the refrigerator compartment 14 is received within the refrigerator compartment receiving area 42, thereby defining the insulation gap 54 therebetween. The insulation gap 54 is configured to receive an insulator material 80. The insulation gap 54 may have a thickness of between about 12 mm to about 22 mm. The insulation gap 26 may have an air pressure of less than about 1 atm (101,325 Pa), less than about 0.5 atm (50,662.5 Pa), less than about 0.1 atm (10,132.5 Pa), less than about 0.001 atm (101.325 Pa) or less than about 0.00001 atm (1.01 Pa). The insulating material 80 may be a material configured to have low thermal conductivity. For example, the insulating material 80 may include precipitated silica, polyurethane foam, fumed silica, beads (e.g., of glass, ceramic, and/or an insulative polymer), hollow organic spheres, hollow inorganic spheres, renewable materials, processed renewable materials, and combinations thereof. Optionally, an opacifier (e.g., $TiO_2$m SiC and/or carbon black) may be included in the insulating material 80 or materials configured to change the flow properties and packing factor of the insulating material 80.

Figure 3:
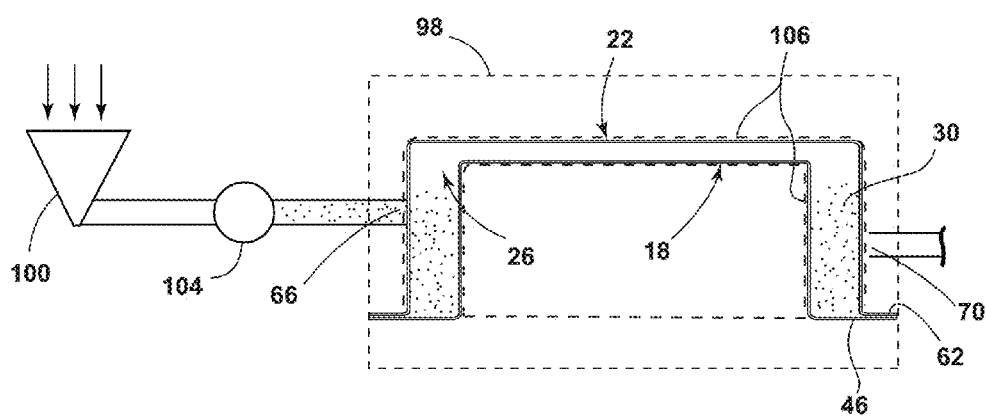
FIG. 3 is a schematic depiction of a refrigerator cabinet insulator filling system, according to one embodiment.

Referring now to FIG. 3, one embodiment of an apparatus and method of inserting the insulating material 80 within the insulation gap 54 is depicted. As shown in FIG. 3, the inner liner 16 is positioned within the external wrapper 30 as explained in greater detail above. The liner flange 28 and the wrapper flange 44 are contemplated to be bonded so as to create an airtight insulation gap 54 defined between the inner liner 16 and the external wrapper 30. A vacuum is created by drawing the air out of the insulation gap 54 through the at least one vacuum port 52, wherein the vacuum provides a negative pressure relative to the atmospheric pressure. A pump, or other suitable vacuum source, may be connected to the vacuum port 52 to facilitate the drawing and creation of the vacuum. Additionally, a vacuum chamber 90 may be used to provide the vacuum to the insulation gap 54.

With further reference to FIG. 3, injecting the insulating material 80 into the insulation gap 54 is contemplated to be accomplished by feeding the insulating material 80 into a hopper 82 which in turn supplies the insulating material 80 to a powder pump 84. The powder pump 84 pumps or otherwise injects the insulating material 80 into the insulation gap 54. The powder pump 84 may utilize fluidization of the insulating material 80 to move the insulating material 80 into the insulation gap 54. The powder pump 84 may dispense the insulating material 80 into the insulation gap 54 under or without pressure. Use of the powder pump 84 allows the insulating material 80 to be inserted into the insulation gap 54 without any densification or compaction, while also providing an efficient means of depositing the insulating material 80 in the insulation gap 54. Vibration techniques may be used to vibrate the inner liner 16 and/or the external wrapper 30 in an effort to increase the packing factor of the cause the insulating material 80 as disposed within the insulation gap 54. The inner liner 16 and/or external wrapper 30 may be supported by one or more supports 86, such that relative motion between the inner liner 16 and the external wrapper 30 is minimized or prevented. The supports 86 may allow the thickness of the insulation gap 54 to remain constant through filling and vibration.

Figure 4:
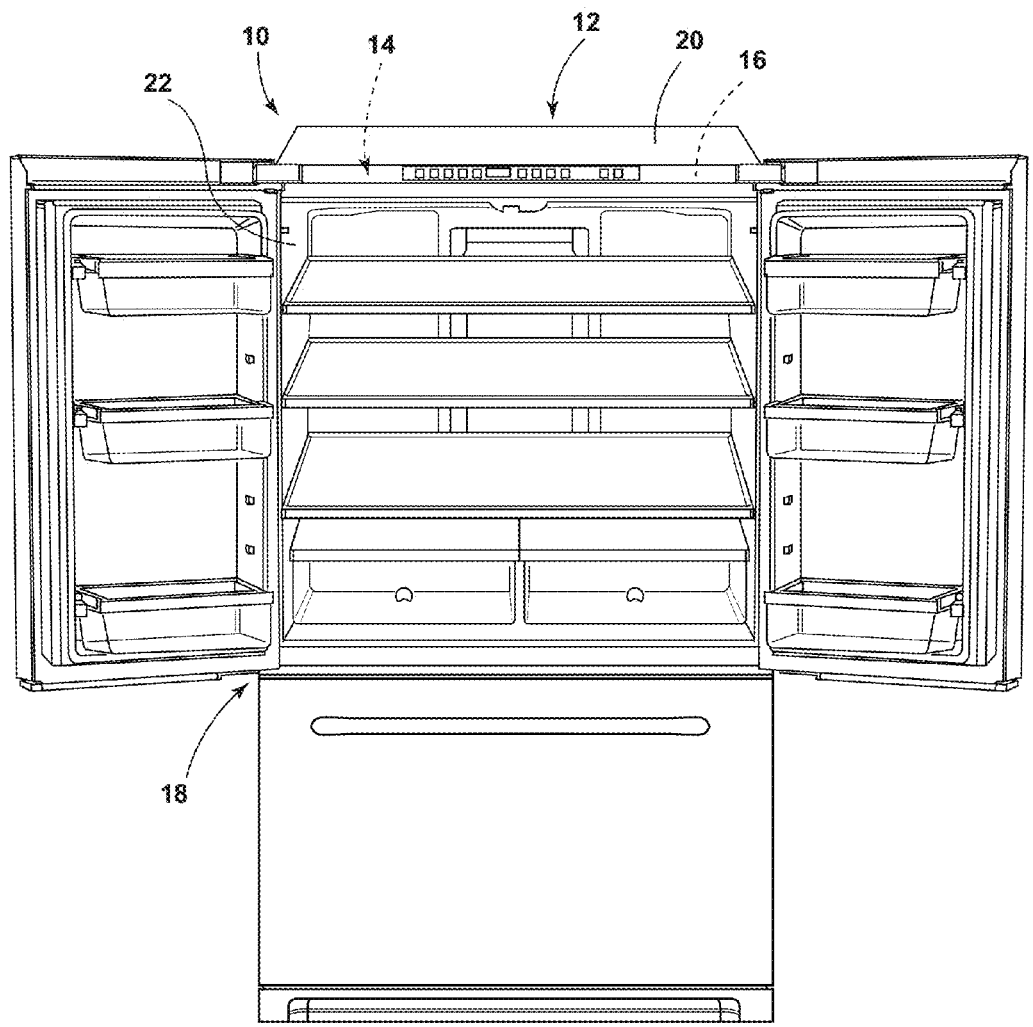
FIG. 4 is a schematic depiction of a refrigerator cabinet insulator filling system, according to one embodiment.

Referring now to FIG. 4, another method of dispensing the insulating material 80 within the insulation gap 54 between the inner liner 16 and the external wrapper 30 is shown. In this method, dispensing of the insulating material 80 into the insulation gap 54 may be accomplished through an access aperture 92. The back aperture 92 may take a variety of shapes (e.g., square, rectangular, circular, oblong, and combinations thereof) and sizes which are configured to allow the insulating material 80 to be poured or otherwise deposited into the insulation gap 54. The insulating material 80 may be positioned in the insulation gap 54 between the inner liner 16 and the external wrapper 30 via a powder pump, such as powder pump 84 described above with reference to FIG. 3. Further, the insulating material 80 may be positioned in the insulation gap 54 by pouring a mixture containing the insulating material 80 into the insulation gap 54. The insulating material 80 may be positioned in the insulation gap 54 by spraying a foaming mixture containing the insulating material 80 into the insulation gap 54. Further, the insulating material 80 may be positioned in the insulation gap 54 by creating blocks or panels containing the insulating material 80, and positioning these blocks and/or panels in the insulation gap 54. Once the insulation gap 54 between the inner liner 16 and the external wrapper 30 is filled with the insulating material 80 and sufficiently packed, a cover 94 is positioned over the access aperture 92. The cover 94 may be constructed of the same or similar material as the external wrapper 30, or a different material. Once the cover 94 is positioned over the access aperture 92, the cover 94 is sealed to the external wrapper 30 to form an airtight, or hermetic, seal. With the airtight seal in place, a vacuum can be drawn within the insulation gap 54 in a manner as described above. The vacuum may be drawn through the vacuum port 52 (FIG. 3) of the external wrapper 30. Additionally, this method can also be conducted in a vacuum chamber 90.

Figure 5:
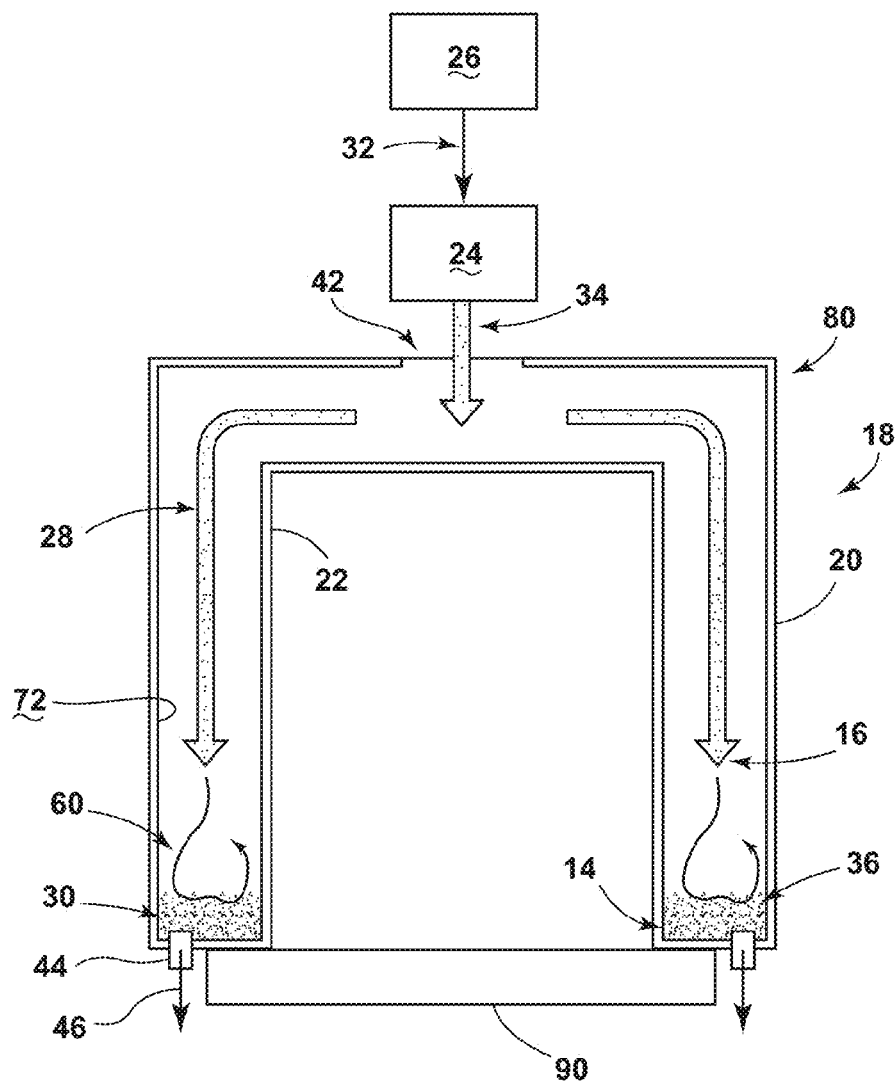
FIG. 5 is an exploded view of an inner liner and external wrapper, according to one embodiment.

Referring now to FIG. 5, another embodiment of a cabinet 12A is shown in an exploded view with an inner liner 16A which generally defines a refrigerator compartment 14. The inner liner 16A includes a number of components similar to inner liner 16 described above with like reference numerals, such as first and second sidewalls 18, 20, top wall 22 and bottom wall 24. A rear wall 26 closes the refrigerator compartment 14. A liner flange 28 is disposed around the inner liner 16A along a front portion thereof. The cabinet 12A further includes an external wrapper 30A. The external wrapper 30A includes a number of components similar to external wrapper 30 described above with like reference numerals, such as first and second sidewalls 32, 34, top wall 38 and rear wall 40. Thus, the external wrapper 30A has an overall configuration similar to that of the inner liner 16A, such that the refrigerator compartment 14 of the inner liner 16A can be fully received within a refrigerator compartment receiving area 42 defined by the wrapper walls 32, 34, 36 and 40. The external wrapper 30A includes a wrapper flange 44 disposed at a forward portion of the external wrapper 30A.

As further shown in FIG. 5, the sidewall 32 of the external wrapper 30A includes an insulation member 102 disposed thereon. Similarly, sidewall 34 and top wall 36 also include insulation members 104, 106, respectively, disposed thereon, which are shown in phantom in FIG. 5. Rear wall 40 of the external wrapper 30A also includes an insulation member 108 disposed thereon. The insulation members 102, 104, 106 and 108 are disposed on inwardly facing surfaces, such that the insulation members 102, 104, 106 and 108 are configured to be disposed in the insulation gap 54 disposed between the inner liner 16A and external wrapper 30A, as best shown in FIG. 6.

Figure 6:
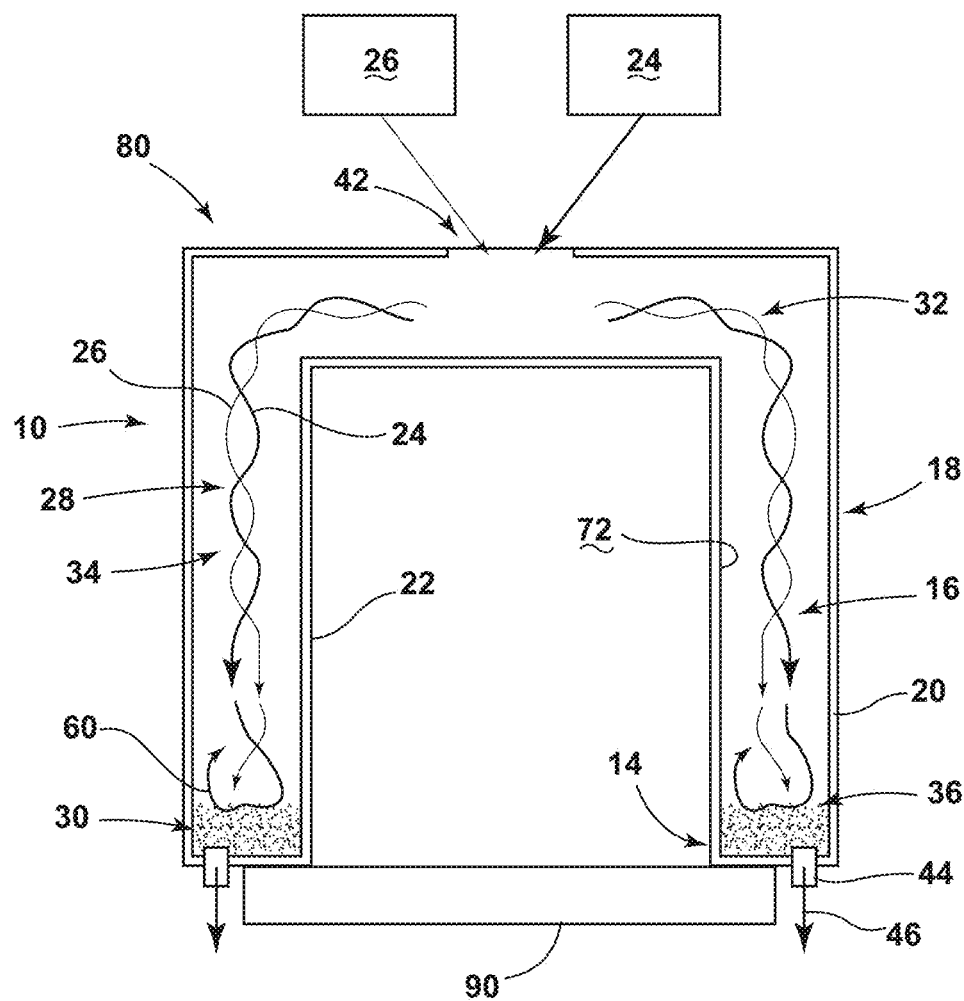
FIG. 6 is a cross-sectional view of a refrigerator cabinet having first and second insulation materials disposed in an insulation gap.

As shown in FIG. 6, a cross-sectional view of the refrigerator cabinet 12A separately illustrates three embodiments for the insulation members, with insulation member 102 in a board form, insulation member 104 in a powder form, and insulation member 108 as loose fiberglass. Each insulation member 102, 104 and 108 are shown covered by barrier sheets 112, 114, and 118 respectively. The barrier sheets 112, 114, and 118 are contemplated to be metallic foil sheets that can be formed from either a ferrous or non-ferrous material. Of course, although a metallic material is preferred, the barrier sheets 112, 114, and 118 can also be formed from non-metallic materials without departing from the spirit of the present concept. When placed upon the insulation members 102, 104 and 108, the sheets 112, 114, and 118 define upper surfaces that protect the insulation members 102, 104 and 108 from water vapor and other like destructive materials. When the refrigerator cabinet 12A is assembled to form the insulation gap 54 (in which the insulation members 102, 104 and 108 are disposed), a second insulation material 122, preferably polyurethane foam, is contemplated to be injected between each barrier sheet 112, 114, and 118 and the outer walls of the inner liner 16A, such that a composite insulation arrangement is formed. Once second insulation material 122 cures, it will not only provide additional insulation for the cabinet 12A, but it will add structural integrity thereto as well. The second insulation material 122 may include silica or other porous material capable of supporting the cabinet structure when a vacuum is formed. It is further contemplated that the insulation members 102, 104 and 108 may substantially fill the entire insulation gap 54 on their own, such that a second insulation material is not necessary. As further shown in FIGS. 5 and 6, evacuation tubes 120 are shown as coupled to each of the insulation members 102, 104 and 108, and may be use to form a vacuum around the insulation members 102, 104 and 108. While insulation members 102, 104 and 108 are shown in FIG. 6 as having varying forms, it is contemplated that the insulation members 102, 104 and 108 may also be of a similar form, such as an insulation panel.

Figure 7:
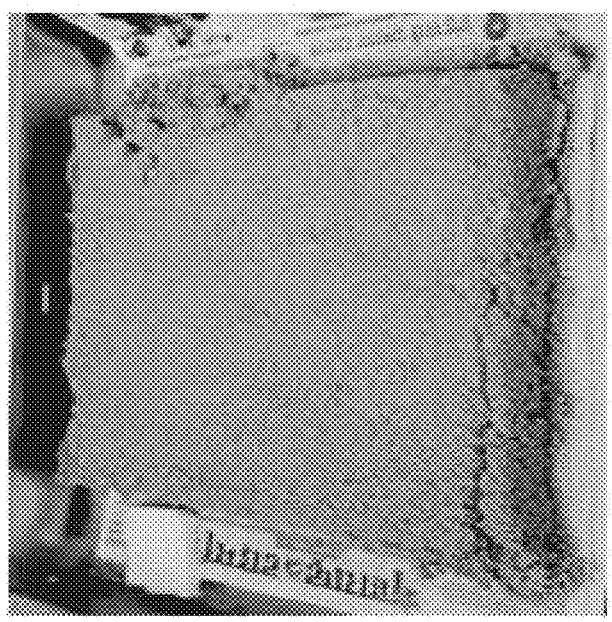
FIG. 7 is a cross-sectional view of a refrigerator cabinet having a plurality of insulation members disposed in an insulation gap.
Figure 7:
Figure 7:
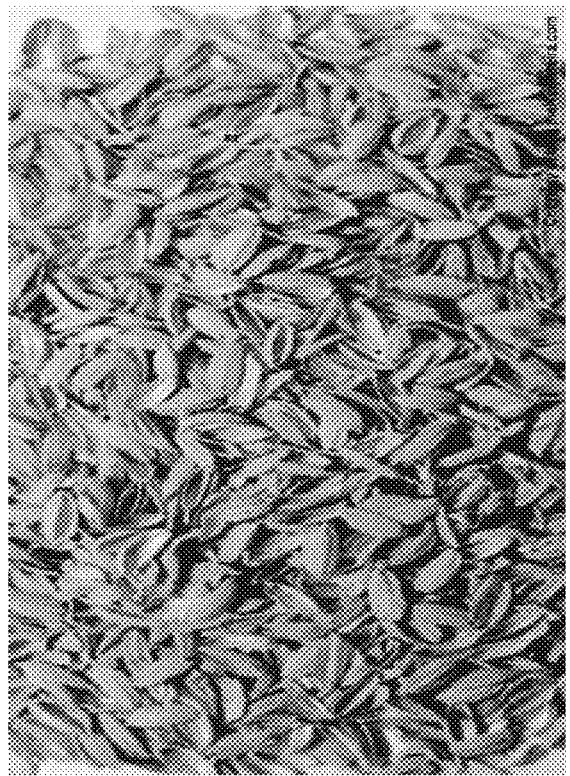

Referring now to FIG. 7, a crossectional view of another refrigerator cabinet 12B is shown, wherein an inner liner 16B is coupled to an external wrapper 30B to form an insulation gap 54 therebetween. Insulation members 124 are shown disposed in the insulation gap 54 to insulate the refrigerator compartment 14. The insulation members 124 shown in FIG. 7 are contemplated to be insulation blocks formed from a multi-component insulating material in a press or mold forming process, as further described below.

Figure 8:
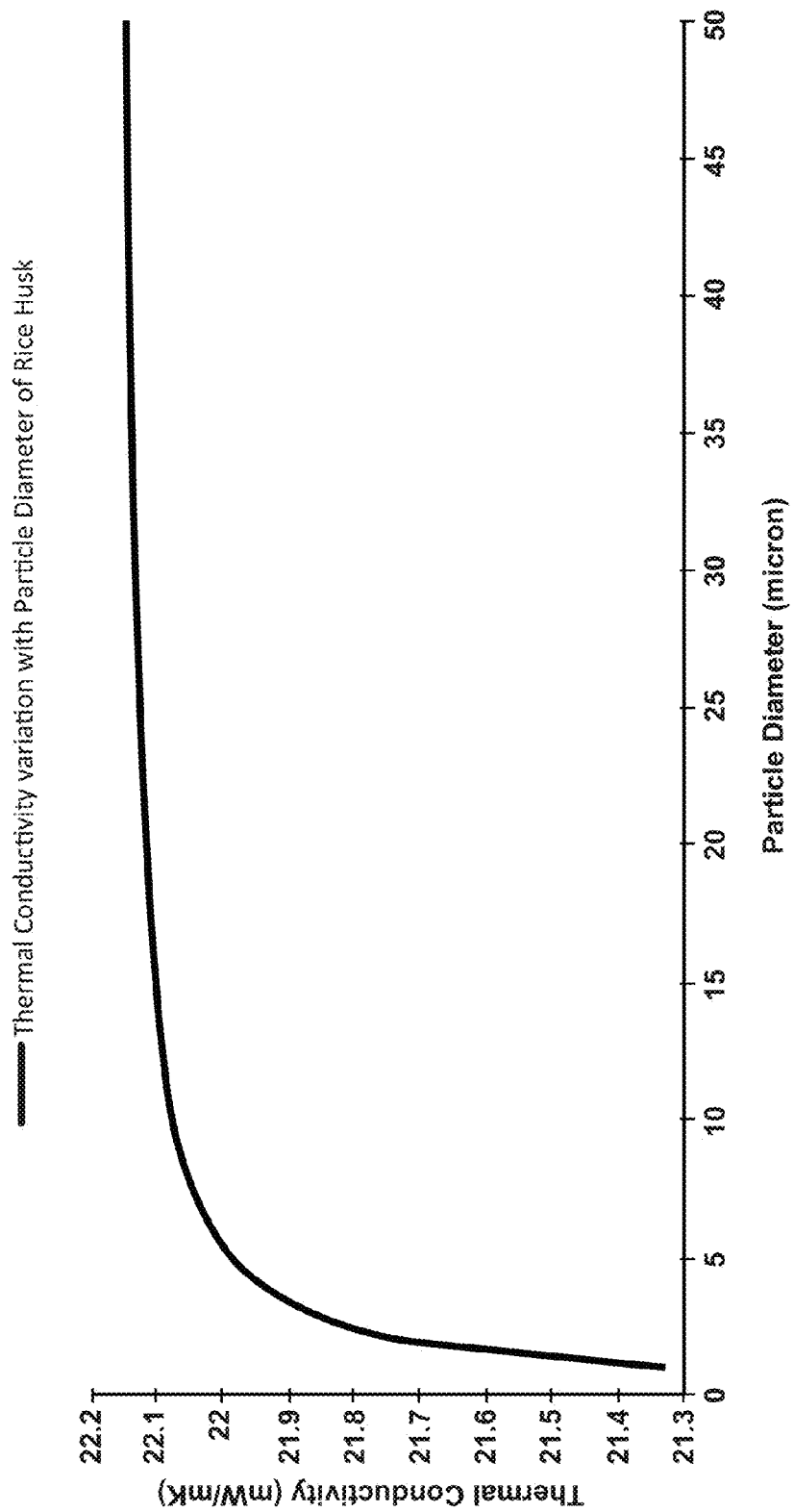
FIG. 8 is a cross-sectional view of a refrigerator cabinet having a plurality of insulation panels disposed in an insulation gap.

Referring now to FIG. 8, a crossectional view of another refrigerator cabinet 12C is shown, wherein an inner liner 16C is coupled to an external wrapper 30C to form an insulation gap 54 therebetween. Insulation members 126, 128 and 130 are shown disposed in the insulation gap 54 to insulate the refrigerator compartment 14 defined by the cabinet 12A. The insulation members 126, 128 and 130 are shown in FIG. 7 as insulation panels having core portions 126A, 128A and 130A disposed within outer portions 126B, 128B, 130B to form multi-component insulating structures with varying properties between the cores 126A, 128A and 130A and outer portions 126B, 128B, 130B, as further described below.

The insulating materials used for the present concepts will now be described. As noted above, the insulation material used with the present concept is contemplated to provide a renewable resource, or environmentally friendly resource, as a component part of the insulation composition. This measure not only provides for more environmentally friendly insulating practices, but also can save on the costs involved in properly insulating a refrigerator cabinet as compared to standard polyurethane foams. Specifically, the cost of an insulation made with a renewable resource may cost about $0.10 per kilogram as compared to about $2.419 per kilogram of polyurethane foam. Often times the insulation made with the renewable resource exemplifies a similar insulating property or may include only a 5% heat gain as compared to polyurethane foam materials. As used herein, the terms "renewable resource component" or "renewable resource" refer to filler materials that are eco-friendly materials, such as an organic material, a biomass material, a natural waste by-product of a particular industry, or other like naturally occurring component.

One renewable resource contemplated for use as an organic component of the insulating materials of the present concept are rice husks or rice hulls which are the hard protective outer coverings of grains of rice. Rice husks are a thermal insulating material comprised of approximately 70-75% silica. Using thermal treatments, the silica percentage in rice husks can be increased to approximately 90-98%. Silica is a known compound that is one of the better insulators used in vacuum insulation panels and other high performance thermal insulation applications. Preparing rice husks for use in an insulation material may include the following steps:

1) washing rice husks in distilled water;
2) drying the rice husks in hot air at 60 degrees Celsius for approximately sixty minutes;
3) sizing the rice husks using an industrial grinder;
4) mixing rice husks with a binding resin at a ratio of approximately 2:1 rice husks to resin by weight;
5) stirring the rice husks in biding resin to properly mix the composition;
6) comparing insulating blocks using a press and mold with the composition; or
7) preparing panels for use as vacuum insulation panels with the composition.

The rice husk, or a composition containing rice husks, may be passed through a sieve of about 10 microns to about 25 microns to achieve a particle size optimal for using rice husks as a renewable resource component in an insulating material. With a rice husk particle size of about 10 microns to about 25 microns, a thermal conductivity value of approximately 20-22 mW/mK is achieved as compared to a standard polyurethane foam having a thermal conductivity value of about 17.5 mW/mK to about 20.5 mW/mK.

Coconut husks are also a renewable resource considered for use with the insulating materials of the present concept. Like the rice husks, coconut husks are a good thermal insulating material because they are difficult to burn and less likely to allow moisture to propagate mold and fungi in an application. Historically, coconut husks have been used in making insulation boards using a urea formaldehyde resin. In order to eliminate this synthetic resin, it is contemplated that the present concept will use lignin in the coconut husks as an intrinsic resin in board production, thereby eliminating the need for chemical binders and other additives. A insulating product using coconut husks may exhibit insulating properties in a range of about 54-143 mW/Mk.

Another renewable resource contemplated for use with the present concept are corn cobs and corn stalks. Corn cobs and corn stalks can be used to make particle boards and fiber boards and have been tested for use as raw materials for low density boards made using a hot press method along with a urea formaldehyde resin. Such boards exhibit a high mechanical strength and have a thermal conductivity of approximately 96 mW/mK.

Another renewable resource contemplated for use with the present concept is durian peel. Durian peel is the outer covering of a durian fruit, and is a waste product of the durian industry. Particle boards made using a durian peel have exhibited a thermal conductivity in the range of approximately 64-159 mW/mK.

Another renewable resource contemplated for use with the present concept is bagasse. Bagasse is the crushed and processed cane stalk of sugar cane that is left when the juice is collected from a sugar cane harvest. Bagasse is a waste produce of the sugar cane industry that can be used as a raw material for making medium density fiber boards or particle boards, as well as high density hard boards. Bagasse can be further fortified using a phenolic resin, thereby producing boards and panels that are strong and durable, as well as heat and moisture resistant. These boards can be lightweight and easily transportable and exhibit thermal conductivity properties suitable for use with the present concept in a thermal conductivity range of about 46-51 mW/mK.

Another renewable resource contemplated for use with the present concept is a bi-product from the palm oil production process. Oil palm leaves include large amounts of ligno-cellulose having a high fiber yield and are known for use in making composite panels and particle boards. Such a composite panel may have a thermal conductivity of approximately 127 mW/mK made by mixing oil palm leaves with granular wood glue in a 1:4 ratio by weight. The present concept is contemplated to use the ligno-cellulose component of the oil palm leaves to make a binder free fiber board using a steam expulsion method. Such a resulting insulating material would be environmentally friendly by not incorporating a toxic glue, and would also provide insulating properties similar to those of an insulation panel made by mixing oil palm leaves with wood glue. The above-identified organic components are integrated into insulation products to provide a renewable resource component within the product.

Processes for incorporating a renewable resource component into an insulating material will now be described, and particularly, rice husks are identified below as the incorporated renewable resource, however, it is contemplated that any of the renewable resources noted above can be used with the methods described below. The first method of incorporating a renewable resource into an insulating product is the mixing of the renewable resource component with the components of a polyurethane foam. In this concept, rice husks and polyurethane foam are mixed in optimized ratios to deliver improved thermal insulating properties as compared to a rice husk insulation alone. Mixing the rice husk with a polyurethane foam eliminates the need for additional binder as the component parts of a polyurethane foam will act as a binder in the mixing process. The polyurethane form also adds structural rigidity as compared to rice husk insulation alone. In making a standard polyurethane foam, isocyanate and polyols are mixed generally in a spraying process to create a urethane foam. Processed rice husks having a particle size of approximately 10-25 microns can be incorporated into either the isocyanate mixture or the polyol mixture before they are combined to form a urethane. Further, the processed rice husks can be combined with the isocyanate and polyol mixture immediately after the isocyanate and polyol components are mixed. Using the present concept, it is contemplated that a resulting polyurethane foam would contain approximately 10-90 percent or 40-60 percent by weight of the rice husk mixture which would be distributed uniformly throughout the resulting polyurethane foam. The addition of the rice husk in the polyurethane foam provides for a lower cost product that is lighter than the polyurethane foam alone. Further, as noted above, the processed rice husk component will reduce the costs of the overall insulating product. Similarly, the rice husks can be mixed with other synthetic closed cell insulation products, such as cyclopentane foam products and are contemplated to exhibit comparable compression strengths as compared to such products made without a renewable component.

Another method involves providing a mixture of a renewable resource with a binder, wherein the resulting mixture is poured into an insulation gap, such as insulation gap 54 described above, for forming an insulating product that can fill the insulation gap in a cabinet. This method provides for environmentally friendly insulation without any polyurethane foam, such that the cost of the resulting insulation product are reduced. In this concept, processed rice husk particles of approximately 10-25 microns are mixed with a resin, such as an epoxy resin, for forming a pourable mixture. Suitable epoxy resins include epoxy cements, cross-linked polyvinyl alcohol and polyacrylamide and other cross-linked polymers that will not compact or densify the processed rice husk when mixed therewith. The resulting mixture can be poured into an insulation gap, such as insulation gap 54 shown in FIG. 4 using access aperture 92.

Another method used with the present concept is to use processed rice husks as packed in insulation panels which are then vacuumed. This concept involves using processed rice husks instead of fumed silica, glass fibers or precipitated silica. The resulting product provides for an insulation material that does not require additional binder and is less expensive than a standard polyurethane foam. A variation of thermal conductivity as it relates to internal pressure of such an insulation panel is noted below in Table 1.

TABLE 1

| Internal Pressure (mbar) | Thermal Conductivity (mW/mK) |
|---|---|
| 1000 | 22.0 |
| 500 | 21.8 |
| 100 | 20.3 |
| 50 | 18.7 |
| 10 | 12.3 |
| 5 | 9.4 |
| 1 | 5.6 |

Figure 9:
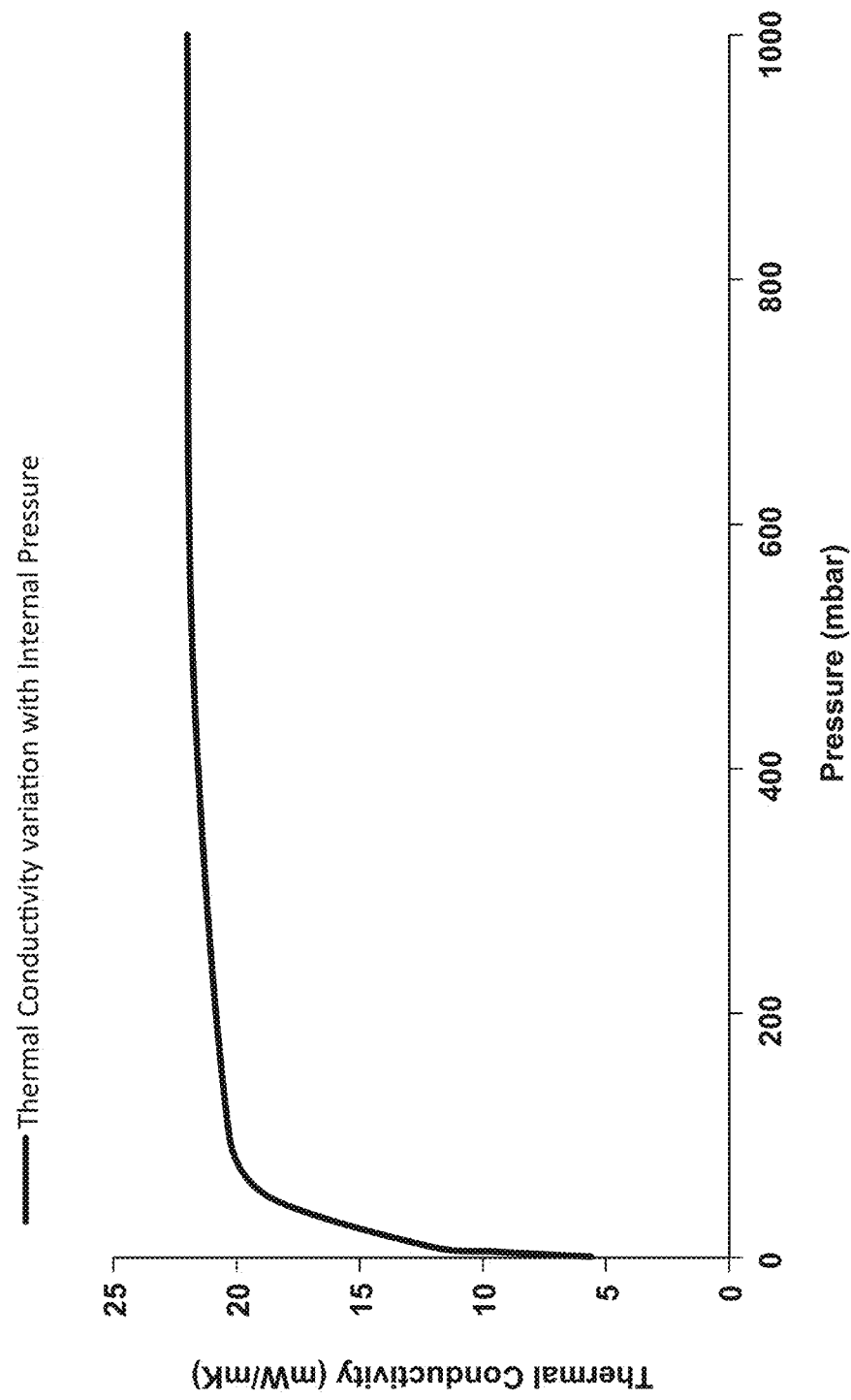
FIG. 9 is a graphical representation of a thermal conductivity value relative to a pressure value.

The values noted in Table 1 above are also shown in FIG. 9 of the present disclosure.

Figure 10:
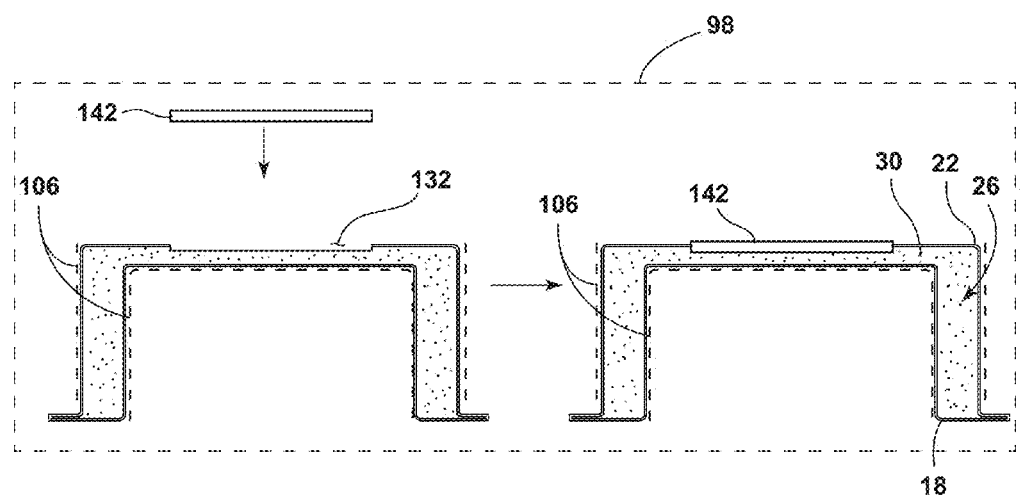
FIG. 10 is a graphical representation of a thermal conductivity value relative to a particle diameter.

Another method of using a renewable resource with an insulating product of the present concept is to create an insulating product having a polyurethane foam blanket or outer portion wrapped around a core portion created using a renewable resource. As noted above, and further shown in FIG. 10, the particle size of the rice husks used with the present concept is contemplated to be between 10 and 25 microns. As shown in FIG. 10, a particle diameter of 10-25 microns results in a thermal conductivity value of approximately 22-22.2 mW/mK. Rice husks have an open cell structure, such that an insulating product prepared using rice husk alone is susceptible to increased thermal conductivity when exposed to water vapor or water permeation through a liner or wrapper in a refrigerator cabinet. This is because as water vapor, or any other moisture source, is exposed to the open cell structure of a rice husk, the water can be absorbed by such an insulating product, thereby increasing the solid conduction of the rice husk insulation product. With an increase in thermal conductivity of such a rice husk insulation product, the thermal performance of a refrigerator or insulation box may be compromised. Thus, a polyurethane foam blanket around a rice husk prepared core would provide a closed cell structure for an outer portion of a panel (or other like structure) that will not allow water vapor to permeate inside into the rice husk core. The rice husk core may be a powered insulation used in the process described above with reference to FIG. 3, wherein a powered product is injected into the insulation gap 54 of a cabinet 12. With reference to FIG. 8, the rice husk insulation would generally comprise a core portion 126A having an open cell configuration susceptible to higher thermal conductivity when exposed to water vapor. As further shown in FIG. 8, the core portion 126A is wrapped by an outer covering 126B which is contemplated to be comprised of a polyurethane foam which is a closed cell structure that will not allow water permeation, such that the core portion 126A retains its insulating properties. As noted above, a rice husk insulation product is less expensive than a standard polyurethane product, such that a panel having a rice husk insulating core wrapped by a polyurethane blanket, will result in an overall panel that is less expensive than a standard closed cell panel made entirely of polyurethane products.

It will be understood by one having ordinary skill in the art that construction of the described device and other components is not limited to any specific material. Other exemplary embodiments of the device disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the device as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present device. The exemplary structures and processes disclosed herein are for illustrative purposes and are not to be construed as limiting.

It is also to be understood that variations and modifications can be made on the aforementioned structures and methods without departing from the concepts of the present device, and further it is to be understood that such concepts are intended to be covered by the following claims unless these claims by their language expressly state otherwise.

The above description is considered that of the illustrated embodiments only. Modifications of the device will occur to those skilled in the art and to those who make or use the device. Therefore, it is understood that the embodiments shown in the drawings and described above is merely for illustrative purposes and not intended to limit the scope of the device, which is defined by the following claims as interpreted according to the principles of patent law, including the Doctrine of Equivalents.

What is claimed is:

1. A method of making an insulated cabinet, the method comprising the steps of:
    forming an external wrapper having a cavity;
    forming an inner liner having a refrigerator compartment;
    positioning the refrigerator compartment of the inner liner within the cavity of the exterior wrapper, thereby forming an insulation gap between the inner liner and the external wrapper;
    providing a renewable resource component;
    sizing the renewable resource component to provide particles having a diameter of about 10 to about 25 microns;
    forming an insulation member using the particles of the renewable resource component; and
    positioning the insulating member in the insulation gap.

2. The method of claim 1, wherein the step of providing a renewable resource component further includes:
    providing an amount of rice husk material.

3. The method of claim 2, wherein the step of forming an insulation member further includes:
    intermixing the particles of the renewable resource with a binder to form a mixture.

4. The method of claim 3, wherein the step of positioning the insulating member in the insulation gap further includes:
    pouring the mixture into the insulation gap.

5. The method of claim 1, wherein the step of forming an insulation member further includes:
    forming a core using the renewable component.

6. The method of claim 5, wherein the step of forming an insulation member further includes:
    wrapping the core with an exterior portion, wherein the exterior portion includes a closed cell structure that is impermeable to moisture.

7. The method of claim 1, wherein the step of forming an insulation member further includes:
    intermixing the renewable resource with one of a polyol component and an isocyanate component.

8. The method of claim 7, wherein the step of forming an insulation member further includes:
    spraying the polyol component and the isocyanate component into the insulation gap to intermix the polyol component and the isocyanate component to form a foam insulation member.

9. The method of claim 1, wherein the step of forming an insulation member further includes:
    forming an insulation member wherein the renewable resource component includes a thermal conductivity value in a range from about 20 mW/mK to about 22 mW/mK.

10. The method of claim 9, wherein the step of forming an insulation member further includes:
    forming an insulation member wherein the renewable resource component includes a thermal conductivity value in a range from about 17.5 mW/mK to about 20.5 mW/mK.

11. A method of making an insulated cabinet, the method comprising the steps of:
    forming an external wrapper having a cavity;
    forming an inner liner having a refrigerator compartment;
    positioning the refrigerator compartment of the inner liner within the cavity of the exterior wrapper;
    forming an airtight insulation gap between the inner liner and the external wrapper by sealing a portion of the inner liner to a portion of the external wrapper;
    providing particles of a renewable resource component, wherein the particles include a diameter of about 10 to about 25 microns;
    forming an insulation member using the particles;
    positioning the insulating member in the insulation gap; and
    drawing a vacuum in the insulation gap.

12. The method of claim 11, wherein the step of providing particles of a renewable resource component further includes:
    particles having a thermal conductivity value in a range from about 20 mW/mK to about 22 mW/mK.

13. The method of claim 12, wherein the step of providing particles of a renewable resource component further includes:
   particles having a thermal conductivity value in a range from about 17.5 mW/mK to about 20.5 mW/mK.

14. The method of claim 11, wherein the step of forming an insulation member further includes:
   forming a core using the particles.

15. The method of claim 14, wherein the step of forming an insulation member further includes:
   wrapping the core with an exterior portion.

16. The method of claim 15, wherein the core includes an open cell structure.

17. The method of claim 16, wherein the exterior portion includes a closed cell structure.

18. The method of claim 11, wherein the step of forming an insulation member further includes:
   intermixing the particles of the renewable resource with one of a polyol component and an isocyanate component.

19. The method of claim 18, wherein the step of forming an insulation member further includes:
   spraying the polyol component and the isocyanate component into the insulation gap to intermix the polyol component and the isocyanate component to form a foam insulation member.

* * * * *